W. D. Smith. Hand Garden Plow.

No. 118,290.  Patented Aug. 22, 1871.

Witnesses:
John Becker
Wm. H. C. Smith

Inventor:
W. D. Smith
per
Attorneys.

UNITED STATES PATENT OFFICE.

WILLIAM D. SMITH, OF HOMERVILLE, GEORGIA.

IMPROVEMENT IN HAND GARDEN-PLOWS.

Specification forming part of Letters Patent No. 118,290, dated August 22, 1871.

*To all whom it may concern:*

Be it known that I, WILLIAM D. SMITH, of Homerville, in the county of Clinch and State of Georgia, have invented a new and useful Improvement in Hand Garden-Plow; and I do hereby declare that the following is a full, clear, and exact description thereof, which will enable others skilled in the art to make and use the same, reference being had to the accompanying drawing forming part of this specification, in which—

Figure 1:
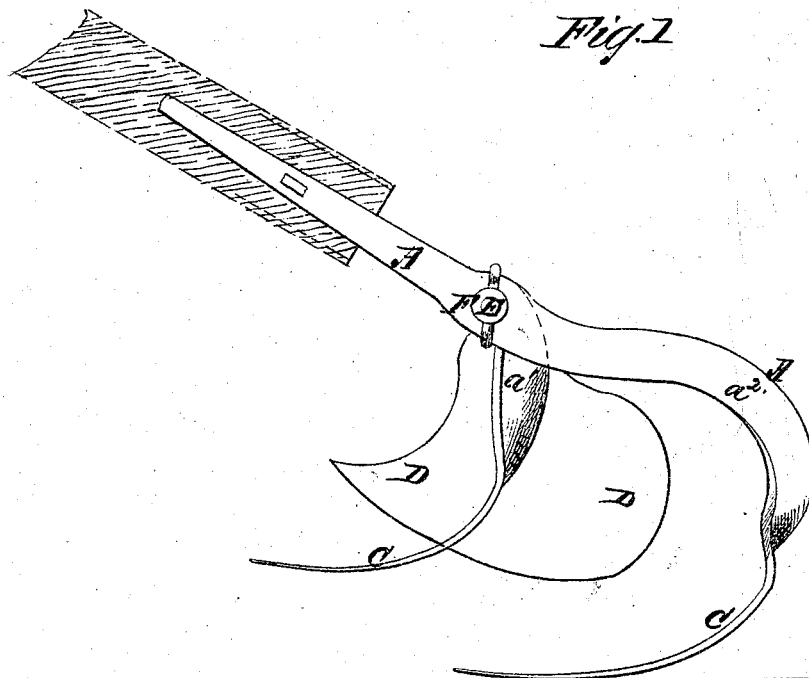
Figure 2:
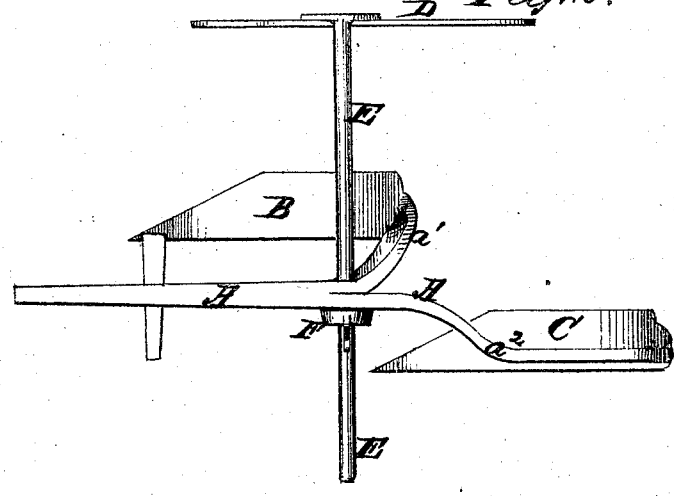

Figure 1 is a side view of my improved plow. Fig. 2 is a top view of the same.

Similar letters of reference indicate corresponding parts.

My invention consists in improving the construction of hand-plows for gardens, as hereinafter fully described and subsequently pointed out in the claim.

A is the shank of the plow, which is inserted in a handle, and secured by a key in the ordinary manner. The lower part of the shank A is divided into two branches of unequal length. The shorter branch $a^1$ is curved to the right and downward, and to its end is attached or upon it is formed the blade B. The other or longer branch $a^2$ is curved outward, upward, and downward, and upon its lower end is formed or to it is attached a blade, C. The blades B C are made thin, narrow, curved, and with sharply-inclined forward edges, as shown in Figs. 1 and 2, bringing them to a sharp point, as shown in Figs. 1 and 2. D is a guard-plate or fender, made thin, flat, and broad, and about the form shown in Fig. 1. The guard or fender D is formed upon or attached to the end of the rod E, which passes horizontally through a hole in the shank A, at or near its branching point, and is secured in place by a hand-nut, F, screwed upon its end.

This construction enables the fender or guard to be turned down when cultivating small plants, turned up when cultivating larger plants, and to be readily detached when required.

The handle should be about six feet long, so that it may be grasped nearer to or further from the plows, according to the height of the operator.

Having thus described my invention, I claim as new and desire to secure by Letters Patent—

A garden-plow, consisting of two acute-angled blades, B C, an upwardly-rising shank, A, and a fender, D E F, when all are constructed so that the plow may be operated by hand, as described.

WILLIAM D. SMITH.

Witnesses:
    H. A. MATTOX,
    E. L. MOORE.